United States Patent Office 3,347,905
Patented Oct. 17, 1967

3,347,905
2-SUBSTITUTED-2-AMINOMETHYL-3-SUBSTITUTED PHENYLALANINE
Meyer Sletzinger, North Plainfield, Raymond A. Firestone, Westfield, and Donald F. Reinhold, North Plainfield, N.J., assignors to Merck & Co., Inc., Rahway, N.J., a corporation of New Jersey
No Drawing. Filed Mar. 6, 1964, Ser. No. 350,081
6 Claims. (Cl. 260—471)

ABSTRACT OF THE DISCLOSURE

Alpha-aminomethyl derivatives of ring hydroxy and/or alkoxy phenyl alanine compounds are inhibitors of mammalian decarboxylase and antihypertensive agents, as well as intermediates for norepinephrine analogs. They are prepared by reducing hydroxy and/or alkoxy benzaldehydes to the corresponding benzyl alcohol, converting the alcohol to the benzyl halide and reacting this with an alpha-acylaminocyanoacetic ester to form an alpha-acylamino, alpha-cyano, beta-substituted phenyl propionic acid. The nitrile group is then reduced to an alpha-methylamino group and the alpha-acylamino group is hydrolyzed to the free alpha-amino group. If desired, the alkoxy groups on the phenyl ring are then hydrolyzed.

---

This invention relates to new amino acids. More particularly, it relates to new phenylalanine type compounds. Still more particularly, it relates to compounds of the formula:

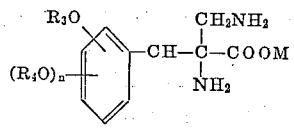

in which:

M may be lower alkyl, hydrogen, or an alkali metal cation;
$n$ may be 0, 1, or 2;
$R_3$ and $R_4$ may be hydrogen, lower alkyl or when $R_3$ and $R_4$ are ortho to each other and taken together, methylene;

and to acid addition salts thereof and to intermediates in the preparation thereof.

We have found the alanine compounds of the class described above are active as inhibitors of mammalian decarboxylase. In addition, we have found these compounds to be very valuable anti-hypertensive agents, usable in cases of malignant hypertension.

In their use in vivo, these amino acids may be given orally or parenterally. Dosages for oral administration will vary from 10 to 500 milligrams per kilo per day. For oral administration to humans, the dosage range is 0.1 to 5.0 grams per day, preferably, 0.5 to 1.5 grams per day, usually in frequent, small doses.

The compounds of our invention can be mixed with any convenient ingredient for tablets. They may be also given parenterally and can be mixed with any of the conventional materials and carriers used in compositions for that method of application. They may also be mixed with any other anti-hypertensive agent in combination.

These compounds can also be utilized as intermediates in the preparation of norepinephrine-like compounds. Such compounds can be prepared by decarboxylation of the amino acid followed by hydroxylation on the β-carbon of the resulting amine. The decarboxylation can be carried out by the use of an enzyme catalyst (e.g., mammalian decarboxylase is readily obtainable by evaporation of the aqueous extract of ground hog or beef kidney or liver).

The amino acid is heated at 37° C. with the enzyme and the coenzyme pyridoxylphosphate in an aqueous medium, buffered at a pH of 6.8, to give the corresponding amine. Hydroxylation of the β-carbon can be achieved by several routes. One is an enzymatic conversion by heating in a pH 6.8 buffered aqueous medium in the presence of slices of mammalian liver (beef or hog, e.g.). Such a method is shown by Senoh et al., J. Am. Chem. Soc. 81 6236 (1959). Another is by the chemical method of Senoh and Withop, J. Am. Chem. Soc. 81 6222 (1959). The resulting products are related to norepinephrine in the same way that the amino acids are related to dihydroxyphenylalanine. Compounds of the structure of the norepinephrine type are known to have utility as pressor agents and the alanine compounds of this invention are thus also valuable intermediates in the preparation of such compounds.

In accordance with this invention, as shown in Flow Sheet II, the starting material, 2-substitutedamido-2-cyano-3-(substitutedphenyl) propionic acid ester, is reduced with a hydrogenation catalyst. The 2-substitutedamido-2-aminomethyl - 3 - (substitutedphenyl)propionic acid ester mineral acid salt thus formed is then hydrolyzed and dealkylated in concentrated mineral acid to the α-aminomethyl hydroxysubstitutedphenylalanine mineral acid salt. Alternatively, the aminomethyl propionate compound may be hydrolyzed with dilute acid to form first the α-aminomethyl substitutedphenylalanine mineral acid salt, then treated further with a more concentrated solution of a mineral acid to obtain the corresponding hydroxy substituted alanine compound. Alternatively again, the aminomethyl propionate compound may be treated with an alkali metal lower alkoxide to form the α-aminomethyl substitutedphenylalanine alkali metal salt. In those cases where the substituents on the phenyl molecule is methylenedioxy, this group will remain throughout the sequence of steps in the process, to yield the final methylenedioxyphenylalanine compound. All the alanine mineral acid salt compounds thus formed may be ultimately converted to the free alanine compound by reaction with a lower alkylene oxide or by cautious neutralization. The free alanine compound may be converted back to an acid addition salt by treatment with an organic acid such as citric acid or acetic acid or a mineral acid such as hydrochloric acid—all of these acid salt compounds being equivalent in usage to the free acid compounds. Finally, the esters of both the free acids and acid salts may be prepared by treating the said compounds with an alcohol in the presence of a catalytic amount of acid or other agents used for esterifications.

The 2 - substitutedamido - 2 - cyano - 3 - (substitutedphenyl) propionic acid ester starting material may be prepared (see Flow Sheet I) by reducing a corresponding substituted benzaldehyde (obtained from British Patent 936,074) to the corresponding alcohol, which in turn is converted to the substitutedbenzyl halide by treatment with a concentrated solution of a hydrohalic acid. The benzyl halide is then treated with sodium hydride and a cyanoacetate

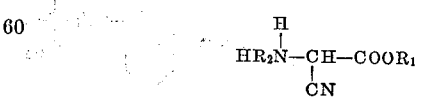

in a solvent at low temperatures, to produce the starting material of this invention.

The starting materials in the process of this invention may contain any lower alkoxy substituent on the aromatic radical (methoxy, ethoxy, propoxy and the like) as well as hydroxy or methylenedioxy, preferably methoxy or hydroxy, but especially methoxy. The α-substituted amido cyanoacetic acid ester portion of the starting material may have any lower alkyl (methyl, ethyl, propyl, butyl and the like) or ar-lower alkyl (phenylethyl, phenylpropyl, phenylbutyl and the like) as the ester group, preferably phenylethyl or ethyl, but especially ethyl. In the preferred process for preparing the preferred novel compounds, the starting material is ethyl-2-acetamido-2-cyano-3-(3,4-dimethoxyphenyl) propionate. The preferred novel compounds thus prepared are as follows: ethyl-2-acetamido-2-aminomethyl-3-(3,4-dimethoxyphenyl) propionate hydrochloride, ethyl-2-acetamido-2-aminomethyl-3-(3,4 - dihydroxyphenyl) propionate hydrochloride, α-amino-3,4-dimethoxyphenylalanine·HCl, α-amino-3,4-dihydroxyphenylalanine·HCl, α - amino - 3,4 - dihydroxyphenylalanine, and α-amino-3,4-dihydroxyphenylalanine·HCl ethyl ester.

The preparation of the starting materials and the process of our invention is illustrated by Flow Sheets I and II respectively:

FLOW SHEET I

Preparation of the starting material:

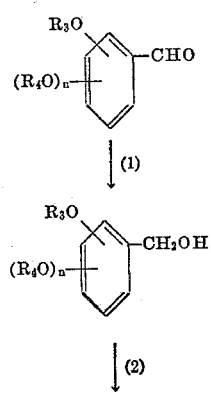

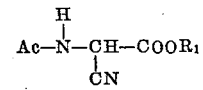

Equivalents:

$n$ is a number from 0 to 2.

$R_3$ and $R_4$ are hydrogen, lower alkyl (methyl, propyl and the like, preferably methyl, and when taken together and ortho to each other, methylene.

X is bromide or chloride.

Reactions and conditions:
(1) Reduction, by direct addition of hydrogen in an inert solvent, in the presence of a hydrogenation catalyst.
(2) Reaction with a 50% mixture of ether and concentrated hydrobromic acid or hydrochloric acid at room temperature for 3 hours.
(3) Reaction with sodium hydride and a cyanoacetate

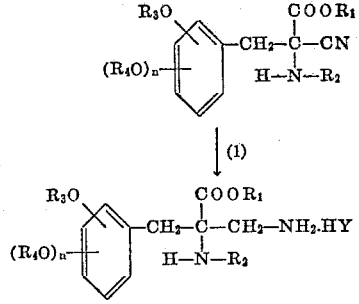

in a non-hydroxylic solvent (dimethylformamide at low temperatures preferred).

FLOW SHEET II

Preparation of compounds of this invention

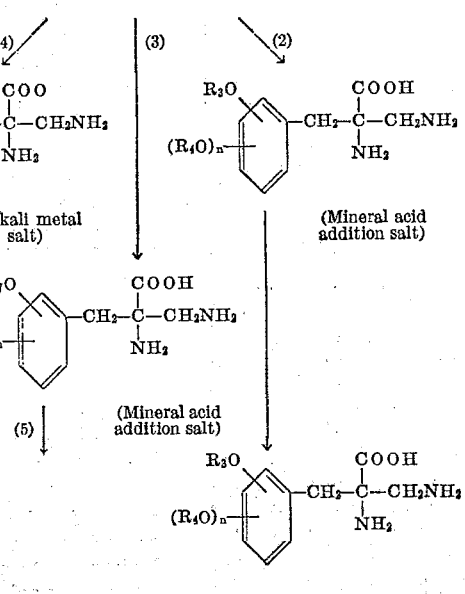

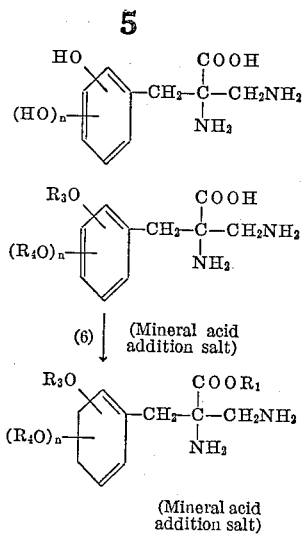

Equivalents:

$n$ is a number from 0 to 2, preferably 1;

$R_1$ is a lower alkyl (methyl, ethyl, propyl and the like) or ar-lower alkyl (benzyl, phenyl-propyl and the like), preferably methyl;

$R_2$ is formyl or acetyl;

$R_3$ and $R_4$ may be hydrogen, lower alkyl (methyl, ethyl, propyl and the like) and when ortho to each other may be methylene, preferably methyl;

$R_7$ and $R_8$ are hydrogen and when ortho to each other and taken together are methylene;

Y is a mineral acid anion such as chloride, sulfate, bromide, phosphate and the like, preferably chloride;

alkali metal salt may be sodium, potassium and the like (preferably sodium).

Reactions and conditions:

(1) Reduction in the presence of a hydrogenation catalyst in a solvent therefor, with a mineral acid at any suitable temperature and pressure until the reaction is substantially complete: The hydrogenation catalyst may be palladium oxide, palladium chloride, platinum oxide, platinum chloride and the like (preferably platinum oxide and palladium oxide) but especially 5–20% platinum oxide. The solvent may be any 6-membered monocyclic hydrocarbon (benzene, toluene, xylene and the like—preferably benzene), lower alkanols (methanol, ethanol, propanol and the like), water and mixtures of water and alcohol (ethanol-water, methanol-water and the like—preferably ethanol-water), but especially ethanol. The mineral acid may be hydrohalic acids (preferably hydrobromic acid or hydrochloric acid), sulfuric acid, phosphoric acid, polyphosphoric acid and the like—especially an excess of hydrochloric acid. The temperature of the reaction may be from 0–100°, preferably 10–40°, and especially ambient temperatures. The hydrogen pressure may be from 5–100 lbs., preferably 30–60 lbs., but especially 35–45 lbs.

(2) Reaction with a dilute solution of mineral acid at any suitable temperature until the reaction is substantially complete: The mineral acid may be hydrohalic acids (hydrobromic acid and hydrochloric acid), phosphoric acid, sulfuric acid, polyphosphoric acid and the like; hydrohalic acids are preferred, especially an excess (3–4 moles) of hydrochloric acid. The reaction may be conveniently run between 10° and reflux, preferably room temperature to reflux, and especially at or near the reflux temperature of the system.

(3) Reaction with a concentrated aqueous mineral acid at any suitable elevated temperature until the reaction is substantially complete: The mineral acid may be hydrohalic acid (hydrochloric acid and hydrobromic acid) and the like, preferably hydrobromic acid or hydrochloric acid, but especially an excess of greater than 5 normal hydrochloric acid (sufficient HCl is used so as to act as solvent also). The temperature may be any elevated temperature (50–180°), preferably above 75°, especially in a sealed vessel at 165–175°.

(4) Reaction with an alkali lower alkoxide in a water-lower alkanol solvent at any suitable elevated temperature until the reaction is substantially complete: The alkali lower alkoxide may be sodium lower alkoxide (sodium methoxide, sodium ethoxide, sodium propoxide and the like), potassium lower alkoxide (potassium methoxide, potassium ethoxide, potassium propoxide and the like), preferably sodium or potassium methoxide, especially an excess of sodium methoxide. The water-lower alkanol solvent may be a mixture of water and methanol, ethanol, propanol, butanol and the like, preferably water-methanol or water-ethanol, but especially water-methanol. The elevated temperature may be 50–150°, preferably above 80°, but especially between 95–110° in a sealed tube.

(5) Reaction with a lower alkylene oxide or an inorganic base in an inert solvent at any suitable temperature until the reaction is substantially complete: The lower alkylene oxide may be ethylene oxide, propylene oxide, butylene oxide and the like. The inorganic base may be sodium bicarbonate, sodium hydroxide, sodium carbonate, potassium carbonate, potassium hydroxide, potassium bicarbonate and the like, preferably a lower alkylene oxide and especially propylene oxide. The inert solvent (inert to the reaction) may be lower ketones (acetone, butyl ketone, pentyl ketone, and the like), ethers (diethyl ether, ethylmethyl ether, dipropyl ether and the like) and lower alkanols (ethanol, methanol, propanol and the like), preferably acetone or sec-butanol, but especially sec-butanol. In the case of neutralization, aqueous solvents are used. The temperature may vary from —5 to 25°, preferably —5 to 15°, but especially 0–5°. An excess of the oxide is normally used, preferably 1–3 moles but especially 1.5–2.5 moles. Having less than an equimolar amount of oxide to alanine will result in lower yields.

(6) Reaction in an excess of a lower alkanol or an ar-lower alkanol in the presence of a mineral acid at an elevated temperature until the reaction is substantially complete: The lower alkanol may be methanol, ethanol, butanol and the like and a lower alkanol may be benzyl alcohol, phenyl propanol and the like, preferably ethanol or benzyl alcohol, but especially ethanol. The mineral acid may be hydrohalic acids (hydrochloric acid or hydrobromic acid), sulfuric acid, phosphoric acid and the like, preferably a catalytic amount of concentrated sulfuric acid or gaseous hydrochloric acid, especially a catalytic amount of concentrated sulfuric acid. The elevated temperature may vary from 35° to the reflux temperature of the system, preferably above 55°, but especially at or near the reflux temperature of the solvent.

In Reaction 1, the amount of acid used is one of the variables determinative of the yield obtained. When less than molar equivalents of the acid to the final product is used, the yield will be lower than when at least 10% excess of acid is used. The rate of reaction is dependent to some extent upon the temperature of the reaction. Generally, temperatures below room temperature will slow down the reaction. The amount and type of hydrogenation catalyst employed will also be determinative of the yield. Using less than 5–10% of the catalyst generally will result in lower yields. However, the cost of the catalyst would be one factor in limiting the upper limits to be used.

In Reactions 2 and 3, the extent of hydrolysis and dealkylation of the benzyl substituents is determined by the acid used, concentration of the acid, and temperature of the reaction. Therefore, when it is desired to obtain only the hydrolysis of the ester, as indicated in Reaction 2, it is preferred to use a slight excess of dilute acid (1–2 normal) at or near the reflux temperature of the solvent for a short reaction time (1–3 hours). Hydrobromic acid, even in a dilute solution, will readily dealkylate the benzyl substituents and, although alkylated material will remain, the use of hydrobromic acid is not recommended when hydrolysis only is desired. To obtain both hydrolysis and dealkylation, a strong mineral acid is used. In this case, although concentrated hydrochloric acid is preferred, hydrobromic acid will serve equally well. (However, sulfuric acid should be avoided, since this acid will readily attack any free hydroxyl groups.) In both Reactions 2 and 3, there should be sufficient acid to both neutralize the amines substituents as well as an excess to carry out the reaction. Where the quantity of acid used approaches the molar value of the amine content, the extent of Reaction 3 will be accordingly diminished. Reaction 2 will also be affected, although to a lesser extent. When one uses conditions between the extremes of low temperature to reflux, dilute acid to concentrated acid, with the various acids indicated, mixtures of alkylated and dealkylated phenylalanines will be obtained.

In Reaction 4, the alkali lower alkoxide may be made in situ by adding an aqueous solution of an alkali hydroxide in the desired alcohol. It is especially preferred to run the reaction in a sealed tube at high temperature. However, lower temperatures may be used and the yield generally maintained, as long as the reaction time is extended. The acid ratio is usually 1–4 moles, preferably 2–3 moles, but especially 2–2.5 moles.

In Reaction 6, the alcohol used for the esterification is used normally as a solvent also. However, other solvents which would not enter into the reaction and in which the reactants are soluble may also be used. When esterification of the alkali salts of the phenylalanine is desired, the alkali salt may first be converted to the free acid followed by esterification as described previously; or the alkali salt may be used directly, in which case an excess of gaseous hydrohalic acid may be used to both neutralize the salt and act as a catalyst for the reaction.

The following examples are given by way of illustration:

EXAMPLE 1

Ethyl acetamido cyanoacetate

A solution of 0.5 mole of ethyl cyanoacetate, 217 ml. of ice water and (0.6 mole) sodium nitrite are stirred together at 3° C. while adding, over 35 minutes, 39.6 ml. of (0.7 mole) glacial acetic acid. The reaction is stirred several hours while the ice melts and allowed to stand overnight. The crystalline mass is filtered and stirred with 250 ml. water and 42 ml. conc. HCl. The resulting mixture is extracted four times with ether, which after drying with $MgSO_4$, filtering and evaporating the solvent, yields crude crystalline α-oximinoethyl cyanoacetate. This crude oximino compound is stirred in 290 ml. 88% acetic acid at 60–63° C. while adding 54.5 g. zinc dust over 1:20 hours. After a short induction period, cooling is required. Reaction is continue for 20 minutes more, cooling is withdrawn, and after another 20 minutes the excess zinc is filtered and washed with three portions of hot ethyl acetate. The combined filtrates are aged several hours at room temperature, filtered again, and the solvents removed in vacuo. The product is washed twice with 1:1 chloroform-cyclohexane and twice with water, then taken up in ethyl acetate, washed with saturated aqueous sodium bicarbonate, dried with magnesium sulfate, filtered, evaporated, and recrystallized from $CHCl_3$ (480 ml.)-cyclohexane (480 ml.) to yield ethyl acetamido cyanoacetate.

When propyl cyanoacetate, pentyl cyanoacetate, benzyl cyanoacetate and phenylbutyl cyanoacetate are used in place of ethyl cyanoacetate in the above example, there are obtained propyl acetamido cyanoacetate, pentyl acetamido cyanoacetate, benzyl acetamido cyanoacetate and phenylbutyl acetamido cyanoacetate respectively.

Similarly, when formic acid is used in place of acetic acid in the above example, there is obtained ethyl formamido cyanoacetate.

EXAMPLE 2

Ethyl-2-acetamido-2-cyano-3-(3,4-dimethoxyphenyl)-propionate

To a solution [7.20 g., 50% dispersion in mineral oil (0.15 mole)] of sodium hydride in 200 ml. of dimethyl formamide is added, with stirring and ice cooling, 0.15 mole of ethyl acetamido cyanoacetate. Hydrogen is evolved vigorously for a few minutes, and after ten minutes 0.15 mole of veratryl chloride is added. Stirring is continued overnight. Most of the solvent is then removed in vacuo, not exceeding a temperature of 37°. The residue is taken up in 250 ml. ethyl acetate and washed with 50 ml. water. The water layer is backwashed with ethyl acetate and filtered to break the emulsion. The combined ethyl acetate layers are washed six times with water and then dried with magnesium sulfate. After filtration and evaporation of the solvent, a clear glassy product (49.45 g.) is obtained which is finally crystallized from ethyl acetate-ether, 12.17 g., M.P. 102–104.5° C.

When veratryl-bromide is used in place of veratryl chloride, there is obtained ethyl 2-acetamido-2-cyano-3-(3,4-dimethoxyphenyl)-propionate.

When propyl acetamido cyanoacetate, pentyl acetamido cyanoacetate, benzyl acetamido cyanoacetate and phenylbutyl acetamido cyanoacetate, obtained from Example 1, are used in place of ethyl acetamido cyanoacetate, there are obtained propyl 2-acetamido-2-cyano-3-(3,4-dimethoxyphenyl)-propionate,
pentyl 2-acetamido-2-cyano-3-(3,4-dimethoxyphenyl)-propionate,
benzyl 2-acetamido-2-cyano-3-(3,4-dimethoxyphenyl)-propionate and
phenylbutyl 2-acetamido-2-cyano-3-(3,4-dimethoxyphenyl) propionate respectively.

When ethyl α-formamido cyanoacetate, obtained from Example 1, is used in place of ethyl-acetamido cyanoacetate in the above example, there is obtained ethyl-2-formamido-2-cyano-3-(3,4-dimethoxyphenyl)-propionate.

Similarly, when 3,4-dipropoxybenzyl chloride, 3,4-dipentoxybenzyl chloride, 3,4-dihydroxybenzyl chloride, 3-hydroxy-4-methoxybenzyl chloride, 3-methoxy-4-hydroxybenzyl chloride, 3,4-methylenedioxybenzyl chloride, 3-methoxybenzyl chloride, 4-hydroxybenzyl chloride, 5-methoxybenzyl chloride, 6-methoxybenzyl chloride and 2,3,4-trimethoxybenzyl chloride are used in place of veratryl chloride in the above example, there are obtained ethyl-2-acetamido-2-cyano-3-(3,4-dipropoxyphenyl)-propionate,
ethyl-2-acetamido-2-cyano-3-(3,4-dipentoxyphenyl)-propionate,
ethyl-2-acetamido-2-cyano-3-(3,4-dihydroxyphenyl)-propionate,
ethyl-2-acetamido-2-cyano-3-(3-hydroxy-4-methoxyphenyl)-propionate,
ethyl-2-acetamido-2-cyano-3-(3-methoxy-4-hydroxyphenyl)-propionate,
ethyl-2-acetamido-2-cyano-3-(3,4-methylenedioxyphenyl)-propionate,
ethyl-2-acetamido-2-cyano-3-(3-methoxyphenyl)-propionate,
ethyl-2-acetamido-2-cyano-3-(4-hydroxyphenyl)-propionate,
ethyl-2-acetamido-2-cyano-3-(5-methoxyphenyl)-propionate,
ethyl-2-acetamido-2-cyano-3-(6-methoxyphenyl)-propionate, and
ethyl-2-acetamido-2-cyano-3-(2,3,4-trimethoxyphenyl)-propionate respectively.

EXAMPLE 3

*Ethyl-2-acetamido-2-aminomethyl-3-(3,4-dimethoxyphenyl)-propionate hydrochloride*

A solution of 20 gms. of ethyl-2-acetamido-2-cyano-3-(3,4-dimethoxyphenyl)-propionate in 200 ml. of ethanol and 11 ml. of 5.7 N hydrochloric acid is hydrogenated at 25° and 40 p.s.i. of hydrogen using 2.0 gms. of platinum oxide. After the theoretical uptake of hydrogen, the catalyst is removed and the solution is concentrated in vacuum to a glass (27 gms.). The product is crystallized when slurried in 200 ml. of ether. Recrystallization from 100 ml. of isopropanol and 50 ml. of ether affords 8.2 gms.; M.P. 163–166° C. calculated for $C_{16}H_{25}ClN_2O_5$: C, 53.25; H, 6.98; Cl, 9.83; N, 7.76. Found: C, 53.15; H, 6.96; Cl, 9.43; N, 7.50.

When the propyl, pentyl, benzyl and phenylbutyl esters, obtained from Example 2, are used in place of ethyl-2-acetamido-2-cyano-3-(3,4-dimethoxyphenyl)-propionate in the above example, there are obtained the corresponding propyl, pentyl, benzyl, and phenylbutyl esters of 2-acetamido-2-aminomethyl-3-(3,4-dimethoxyphenyl)-propionic acid hydrochloride respectively.

Similarly, when ethyl-2-formamido-2-cyano-3-(3,4-dimethoxyphenyl)-propionate, obtained from Example 2, is used in place of ethyl-2-acetamido-2-cyano-3-(3,4-dimethoxyphenyl)-propionate in the above example, there is obtained ethyl-2-formamido-2-aminomethyl-3-(3,4-dimethoxyphenyl)-propionate hydrochloride. Similarly, when ethyl-2-acetamido-2-cyano-3-(3,4-dipropoxyphenyl)-propionate,
ethyl-2-acetamido-2-cyano-3-(3,4-dipentoxyphenyl)-propionate
ethyl-2-acetamido-2-cyano-3-(3,4-dihydroxyphenyl)-propionate,
ethyl-2-acetamido-2-cyano-3-(3-hydroxy-4-methoxyphenyl)-propionate,
ethyl-2-acetamido-2-cyano-3-(3-methoxy-4-hydroxyphenyl)-propionate,
ethyl-2-acetamido-2-cyano-3-(3,4-methyenedioxyphenyl)-propionate,
ethyl-2-acetamido-2-cyano-3-(3-methoxyphenyl)-propionate,
ethyl-2-acetamido-2-cyano-3-(4-hydroxyphenyl)-propionate,
ethyl-2-acetamido-2-cyano-3-(5-methoxyphenyl)-propionate,
ethyl-2-acetamido-2-cyano-3-(6-methoxyphenyl)-propionate, and
ethyl-2-acetamido-2-cyano-3-(2,3,4-trimethoxyphenyl)-propionate, obtained from Example 2, are used in place of ethyl-2-acetamido-2-cyano-3-(3,4-dimethoxyphenyl) - propionate in the above example, there are obtained ethyl-2-acetamido-2-aminomethyl-3-(3,4-dipropoxyphenyl)-propionate hydrochloride,
ethyl-2-acetamido-2-aminomethyl-3-(3,4-dipentoxyphenyl)-propionate hydrochloride,
ethyl-2-acetamido-2-aminomethyl-3-(3,4-dihydroxyphenyl)-propionate hydrochloride,
ethyl-2-acetamido-2-aminomethyl-3-(3-hydroxy-4-methoxyphenyl)-propionate hydrochloride,
ethyl-2-acetamido-2-aminomethyl-3-(3-methoxy-4-hydroxyphenyl)propionate hydrochloride,
ethyl-2-acetamido-2-aminomethyl-3-(3,4-methylenedioxyphenyl)-propionate hydrochloride,
ethyl-2-acetamido-2-aminomethyl-3-(3-methoxyphenyl)-propionate hydrochloride,
ethyl-2-acetamido-2-aminomethyl-3-(4-hydroxyphenyl)-propionate hydrochloride,
ethyl-2-acetamido-2-aminomethyl-3-(5-methoxyphenyl)-propionate hydrochloride,
ethyl-2-acetamido-2-aminomethyl-3-(6-methoxyphenyl)-propionate hydrochloride, and
ethyl-2-acetamido-2-aminomethyl-3-(2,3,4-trimethoxyphenyl)-propionate hydrochloride respectively.

EXAMPLE 4

*α-Aminomethyl-3,4-dihydroxyphenylalanine hydrochloride*

A solution of 3.9 gms. of ethyl-2-acetamido-2-aminomethyl-3-(3,4-dimethoxyphenyl)-propionate hydrochloride in 20 ml. of 6 N hydrochloric acid is purged with nitrogen and sealed in a glass tube. After heating at 170° for 8 hours the tube is cooled and opened. The pale yellow solution is filtered to remove a small amount of carbonized material and then concentrated in vacuum to dryness. The residue is flushed twice with 10 ml. of secondary butanol to remove hydrochloric acid and then slurried in 30 ml. of secondary butanol and filtered. The crude product is dissolved in 4 ml. of water, decolorized with 100 mg. of carbon and then crystallized by the addition of 40 ml. of isopropanol and cooling. The white crystals are filtered and washed with 10% aqueous isopropanol and ether, to yield 1.45 gms.; M.P. 204° C. (decomposes). Repeated drying up to 130° in vacuum fails to remove the last traces of isopropanol. NMR analysis indicates that the product retained 0.2 mole percent of isopropanol. Calculated for $C_{10}H_{15}ClN_2O_4 + 0.2\ C_3H_7OH$: C, 46.34; H, 6.09; Cl, 12.91; N, 10.20. Found: C, 46.38; H, 6.59; Cl, 13.35; N, 10.32. When propyl-2-acetamido-2-aminomethyl-3-(3,4-dimethoxyphenyl)-propionate hydrochloride,
pentyl-2-acetamido-2-aminomethyl-3-(3,4-dimethoxyphenyl)-propionate hydrochloride,
benzyl-2-acetamido-2-aminomethyl-3-(3,4-dimethoxyphenyl)-propionate hydrochloride,
phenylbutyl-2-acetamido-2-aminomethyl-3-(3,4-dimethoxyphenyl)-propionate hydrochloride,
ethyl-2-formamido-2-aminomethyl-3-(3,4-dimethoxyphenyl)-propionate hydrochloride, ethyl-2-acetamido-2-aminomethyl-3-(3,4-dipropoxy-
  phenyl)-propionate hydrochloride,
ethyl-2-acetamido-2-aminomethyl-3-(3,4-dipentoxy-
  phenyl)-propionate hydrochloride,
ethyl-2-acetamido-2-aminomethyl-3-(3,4-dihydroxy-
  phenyl)-propionate hydrochloride,
ethyl-2-acetamido-2-aminomethyl-3-(3-hydroxy-4-
  methoxyphenyl)-propionate hydrochloride,
ethyl-2-acetamido-2-aminomethyl-3-(3-methoxy-4-
  hydroxyphenyl)-propionate hydrochloride,
ethyl-2-acetamido-2-aminomethyl-3-(3,4-methylene-
  dioxyphenyl)-propionate hydrochloride,
ethyl-2-acetamido-2-aminomethyl-3-(3-methoxyphenyl)-
  propionate hydrochloride,
ethyl-2-acetamido-2-aminomethyl-3-(4-hydroxyphenyl)-
  propionate hydrochloride,
ethyl-2-acetamido-2-aminomethyl-3-(5-methoxyphenyl)-
  propionate hydrochloride,
ethyl-2-acetamido-2-aminomethyl-3-(6-methoxyphenyl)-
  propionate hydrochloride, and
ethyl-2-acetamido-2-aminomethyl-3-(2,3,4-trimethoxy-
  phenyl)-propionate hydrochloride, obtained from Example 3, are used in place of ethyl-2-acetamido-2-aminomethyl-3-(3,4-dimethoxyphenyl) - propionate hydrochloride in the above example, there is obtained the α-aminomethyl-substituted-dihydroxyphenylalanine hydrochloride, and in the case of the (3,4-methylenedioxyphenyl) compound, there is obtained α-aminomethyl-3,4-methylenedioxyphenylalanine hydrochloride.

EXAMPLE 5

α-Aminomethyl-3,4-dimethoxyphenylalanine hydrochloride

A solution of 3.9 gms. of ethyl-2-acetamido-2-aminomethyl-3-(3,4-dimethoxyphenyl) - propionate hydrochloride in 20 mls. of 2 N hydrochloric acid is refluxed for 5 hours. The solution is then concentrated in vacuo to dryness. The residue is flushed twice with 10 mls. of sec-butanol to remove the excess hydrochloric acid and then slurried in 30 mls. of sec-butanol and filtered. The crude product obtained is α-aminomethyl-3,4-dimethoxyphenylalanine hydrochloride. When propyl-2-acetamido-2-aminomethyl-3-(3,4-dimethoxy-
  phenyl)-propionate hydrochloride,
pentyl-2-acetamido-2-aminomethyl-3-(3,4-dimethoxy-
  phenyl)-propionate hydrochloride,
benzyl-2-acetamido-2-aminomethyl-3-(3,4-dimethoxy-
  phenyl)-propionate hydrochloride,
phenylbutyl-2-acetamido-2-aminomethyl-3-(3,4-di-
  methoxyphenyl)-propionate hydrochloride and
ethyl-2-formamido-2-aminomethyl-3-(3,4-dimethoxy-
  phenyl)-propionate hydrochloride, obtained from Example 3, are used in place of ethyl-2-acetamido-2-aminomethyl-3-(3,4-dimethoxyphenyl) - propionate hydrochloride in the above example, there is obtained α-aminomethyl-3,4-dimethoxyphenylalanine hydrochloride.

Similarly, when ethyl-2-acetamido-2-aminomethyl-3-(3,4-dipropoxy-
  phenyl)-propionate hydrochloride,
ethyl-2-acetamido-2-aminomethyl-3-(3,4-dipentoxy-
  phenyl)-propionate hydrochloride,
ethyl-2-acetamido-2-aminomethyl-3-(3,4-dihydroxy-
  phenyl)-propionate hydrochloride,
ethyl-2-acetamido-2-aminomethyl-3-(3-hydroxy-4-
  methoxyphenyl)-propionate hydrochloride,
ethyl-2-acetamido-2-aminomethyl-3-(3-methoxy-4-
  hydroxyphenyl)-propionate hydrochloride,
ethyl-2-acetamido-2-aminomethyl-3-(3,4-methylenedioxy-
  phenyl)-propionate hydrochloride,
ethyl-2-acetamido-2-aminomethyl-3-(3-methoxyphenyl)-
  propionate hydrochloride,
ethyl-2-acetamido-2-aminomethyl-3-(4-hydroxyphenyl)-
  propionate hydrochloride,
ethyl-2-acetamido-2-aminomethyl-3-(5-methoxyphenyl)-
  propionate hydrochloride,
ethyl-2-acetamido-2-aminomethyl-3-(6-methoxyphenyl)-
  propionate hydrochloride, and
ethyl-2-acetamido-2-aminomethyl-3-(2,3,4-trimethoxy-
  phenyl)-propionate hydrochloride obtained from Example 3 are used in place of ethyl-2-acetamido - 2 - aminomethyl - 3 - (3,4-dimethoxyphenyl)-propionate hydrochloride in the above example, there are obtained α-aminomethyl-3,4-dipropoxyphenylalanine-hydro-
  chloride,
α-aminomethyl-3,4-dipentoxyphenylalanine-hydro-
  chloride,
α-aminomethyl-3,4-dihydroxyphenylalanine-hydro-
  chloride,
α-aminomethyl-3-hydroxy-4-methoxyphenylalanine-
  hydrochloride,
α-aminomethyl-3-methoxy-4-hydroxyphenylalanine-
  hydrochloride,
α-aminomethyl-3,4-methylenedioxyphenylalanine-
  hydrochloride,
α-aminomethyl-3-methoxyphenyalanine-hydrochloride,
α-aminomethyl-4-hydroxyphenylalanine-hydrochloride,
α-aminomethyl-5-methoxyphenylalanine-hydrochloride,
α-aminomethyl-6-methoxyphenylalanine-hydrochloride,
  and
α-aminomethyl-2,3,4-trimethoxyphenylalanine-hydro-
  chloride respectively.

EXAMPLE 6

Sodium-2-aminomethyl-2-amino-3-(3,4-dimethoxyphenyl)-propionate

A solution of 0.01 mole of ethyl-2-acetamido-2-aminomethyl - 3 - (3,4-dimethoxyphenyl)-propionate hydrochloride and 0.022 mole of sodium hydroxide in a mixture of 100 ml. of water and 200 mls. of methanol is heated in a sealed tube at 100° C. for five hours. The reaction mixture is then removed from the sealed tube and concentrated to dryness in vacuo. To this residue is added 25 mls. of water and the solution is extracted with 3× 50 mls. of ether. The aqueous solution is then concentrated to dryness and titrated with 200 mls. of ethanol. The solution then concentrates to a heavy slurry and filtered. The cake thus obtained is sodium-2-aminomethyl-2-amino-3-(3,4-dimethoxyphenyl)-propionate. When propyl-2-acetamido-2-aminomethyl-3-(3,4-dimethoxy-
  phenyl)-propionate hydrochloride,
pentyl-2-acetamido-2-aminomethyl-3-(3,4-dimethoxy-
  phenyl)-propionate hydrochloride,
benzyl-2-acetamido-2-aminomethyl-3-(3,4-dimethoxy-
  phenyl)-propionate hydrochloride,
phenylbutyl-2-acetamido-2-aminomethyl-3-(3,4-di-
  methoxyphenyl)-propionate hydrochloride and
ethyl-2-formamido-2-aminomethyl-3-(3,4-dimethoxy-
  phenyl)-propionate hydrochloride, obtained from Example 3, are used in place of ethyl-2-acetamido - 2 - aminomethyl - 3-(3,4-dimethoxyphenyl)-propionate hydrochloride in the above example, there is obtained sodium - 2 - aminomethyl - 2 - amino-3-(3,4-dimethoxyphenyl)-propionate. Similarly, when ethyl-2-acetamido-2-aminomethyl-3-(3,4-dipropoxy-
  phenyl)-propionate hydrochloride,
ethyl-2-acetamido-2-aminomethyl-3-(3,4-dipentoxy-
  phenyl)-propionate hydrochloride,
ethyl-2-acetamido-2-aminomethyl-3-(3,4-dihydroxy-
  phenyl)-propionate hydrochloride,
ethyl-2-acetamido-2-aminomethyl-3-(3-hydroxy-4-
  methoxyphenyl)-propionate hydrochloride, ethyl-2-acetamido-2-aminomethyl-3-(3-methoxy-4-hydroxyphenyl)-propionate hydrochloride,
ethyl-2-acetamido-2-aminomethyl-3-(3,4-methylenedioxyphenyl)-propionate hydrochloride,
ethyl-2-acetamido-2-aminomethyl-3-(3-methoxyphenyl)-propionate hydrochloride,
ethyl-2-acetamido-2-aminomethyl-3-(4-hydroxyphenyl)-propionate hydrochloride,
ethyl-2-acetamido-2-aminomethyl-3-(5-methoxyphenyl)-propionate hydrochloride,
ethyl-2-acetamido-2-aminomethyl-3-(6-methoxyphenyl)-propionate hydrochloride, and
ethyl-2-acetamido-2-aminomethyl-3-(2,3,4-trimethoxyphenyl)-propionate hydrochloride, obtained from Example 3, are used in place of ethyl-2-acetamido - 2 - aminomethyl - 3-(3,4-dimethoxyphenyl)-propionate hydrochloride in the above example, there are obtained sodium-2-aminomethyl-2-amino-3-(3,4-dipropoxyphenyl)-propionate,
sodium-2-aminomethyl-2-amino-3-(3,4-dipentoxyphenyl)-propionate,
sodium-2-aminomethyl-2-amino-3-(3,4-dihydroxyphenyl)-propionate,
sodium-2-aminomethyl-2-amino-3-(3-hydroxy-4-methoxyphenyl)-propionate,
sodium-2-aminomethyl-2-amino-3-(3-methoxy-4-hydroxyphenyl)-propionate,
sodium-2-aminomethyl-2-amino-3-(3,4-methylenedioxyphenyl)-propionate,
sodium-2-aminomethyl-2-amino-3-(3-methoxyphenyl)-propionate,
sodium-2-aminomethyl-2-amino-3-(4-hydroxyphenyl)-propionate,
sodium-2-aminomethyl-2-amino-3-(5-methoxyphenyl)-propionate,
sodium-2-aminomethyl-2-amino-3-(6-methoxyphenyl)-propionate, and
sodium-2-aminomethyl-2-amino-3-(2,3,4-trimethoxyphenyl)-propionate.

EXAMPLE 7

α-Aminomethyl-3,4-dimethoxyphenylalanine

To a solution of 27.4 g. of α-aminomethyl-3,4-dimethoxyphenylalanine hydrochloride in 250 mls. of secondary butanol is added 10 mls. of propylene oxide. The mixture is aged at 25° for 5 hours and a precipitated amino acid is filtered, washed with secondary butanol and dried in vacuo to yield α-aminomethyl-3,4-dimethoxyphenylalanine.

When the α-aminomethyl (disubstituted phenyl) and (monosubstituted phenyl) alanine hydrochlorides obtained from Example 5 are used in place of α-aminomethyl-3,4-dimethoxyphenylalanine hydrochloride in the above example, there are obtained the corresponding α-aminomethyl (disubstituted phenyl) and (monosubstituted phenyl) alanines. (When using α-aminomethyl-3,4-methylenedioxyphenylalanine hydrochloride, there is obtained α-aminomethyl-3,4-methylenedioxyphenylalanine.)

EXAMPLE 8

α-Aminomethyl-3,4-dihydroxyphenylalanine

To a solution of 25.7 g. of α-aminomethyl-3,4-dihydroxyphenylalanine hydrochloride in 250 mls. of secondary butanol is added 10 mls. of propylene oxide. The mixture is aged at 25° for 5 hours and a precipitated amino acid is filtered, washed with secondary butanol and dried in vacuo to yield α-aminomethyl-3,4-dihydroxyphenylalanine.

When the α-aminomethyl (disubstituted phenyl) and (monosubstituted phenyl) alanine hydrochlorides obtained from Example 4 are used in place of α-aminomethyl-3,4-dihydroxyphenylalanine hydrochloride in the above example, there are obtained the corresponding α-aminomethyl (disubstituted phenyl) and (monosubstituted phenyl) alanines. (When using α-aminomethyl-3,4-methylenedioxyphenylalanine hydrochloride, there is obtained α-aminomethyl-3,4-methylenedioxyphenylalanine.)

EXAMPLE 9

Ethyl-2-aminomethyl-2-amino-3-(3,4-dimethoxyphenyl)-propionate hydrochloride To a solution of 0.10 mole of α-aminomethyl-3,4-dimethoxyphenylalanine dihydrochloride in 350 mls. of ethanol is added 0.2 ml. of concentrated sulfuric acid and the reaction mixture refluxed for 5 hours. The mixture is then concentrated to a heavy slurry and filtered. The cake is then washed with 2× 100 mls. of cold ethanol, filtered and dried. The dried cake is essentially pure ethyl-2-aminomethyl - 2 - amino-3-(3,4-dimethoxyphenyl)-propionate hydrochloride.

EXAMPLE 10

Ethyl-2-amino-2-aminomethyl-3-(3,4-dihydroxyphenyl)-propionate hydrochloride To a solution of 0.10 mole of α-aminomethyl-3,4-dihydroxyphenylalanine dihydrochloride in 350 ml. of ethanol is added 0.20 ml. of concentrated sulfuric acid and the reaction mixture stirred for 5 hours. The mixture is then concentrated to a heavy slurry and filtered. The cake is then washed with 2× 100 ml. of cold ethanol, filtered, and dried. The dried cake is essentially pure ethyl-2-amino - 2 - aminomethyl - 3 - (3,4-dihydroxyphenyl)-propionate hydrochloride.

When the other α-aminomethyl substituted phenylalanine inorganic acid salts obtained from Example 4 are used in place of α-aminomethyl-3,4-dihydroxyphenylalanine hydrochloride in the above example, there are obtained the corresponding ethyl esters of the said α-aminomethyl substituted phenylalanine inorganic acid salts.

Similarly, when the alkaline metal salts of α-aminomethyl substituted phenylalanine obtained from Example 6 are used in place of α-aminomethyl-3,4-dihydroxyphenylalanine hydrochloride in the above example and an excess (0.33 mole) of gaseous hydrochloric acid is used in place of the sulfuric acid, there are obtained the corresponding ethyl ester hydrochlorides.

We claim:
1. A compound of the formula:

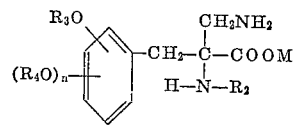

in which:
M is selected from the group consisting of hydrogen, alkali metal cation, lower alkyl and ar-lower alkyl;
$n$ is a number from 0 to 2;
$R_2$ is selected from the group consisting of hydrogen, acetyl and formyl; and
$R_3$ and $R_4$ are selected from the group consisting of hydrogen, lower alkyl and together, methylene and the mineral acid addition salts thereof.
2. α-Aminomethyl-3,4-dihydroxyphenylalanine.
3. α-Aminomethyl-3,4-dimethoxyphenylalanine hydrochloride.

4. α-Aminomethyl-3,4-dihydroxyphenylalanine hydrochloride.

5. Ethyl-2-amino - 2 - aminomethyl-3-(3,4-dihydroxyphenyl)-propionate hydrochloride.

6. Ethyl - 2 - acetamido - 2 - aminomethyl - 3 - (3,4-dimethoxyphenyl)-propionate hydrochloride.

References Cited

UNITED STATES PATENTS 2,868,818  1/1959  Pfister et al. _____ 260—519

RICHARD K. JACKSON, *Primary Examiner.*
L. A. THAXTON, *Assistant Examiner.*